(12) United States Patent
Effenberger et al.

(10) Patent No.: US 9,654,250 B2
(45) Date of Patent: May 16, 2017

(54) ADDING OPERATIONS, ADMINISTRATION, AND MAINTENANCE (OAM) INFORMATION IN 66-BIT CODE

(71) Applicant: Futurewei Technologies, Inc., Plano, TX (US)

(72) Inventors: Frank Effenberger, Colts Neck, NJ (US); Yuanqiu Luo, Cranbury, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/933,939

(22) Filed: Nov. 5, 2015

(65) Prior Publication Data

US 2016/0134392 A1    May 12, 2016

Related U.S. Application Data

(60) Provisional application No. 62/077,467, filed on Nov. 10, 2014.

(51) Int. Cl.
*H03M 13/00* (2006.01)
*H04L 1/00* (2006.01)

(52) U.S. Cl.
CPC .......... *H04L 1/0041* (2013.01); *H04L 1/0057* (2013.01); *H04L 1/0072* (2013.01)

(58) Field of Classification Search
None
See application file for complete search history.

(56) References Cited

U.S. PATENT DOCUMENTS

| 8,122,325 B2 | 2/2012 | Effenberger |
| 8,171,370 B2 | 5/2012 | Effenberger |

(Continued)

FOREIGN PATENT DOCUMENTS

| CN | 101312349 A | 11/2008 |
| CN | 101455019 A | 6/2009 |
| EP | 2063573 A1 | 5/2009 |

OTHER PUBLICATIONS

Foreign Communication From A Counterpart Application, PCT Application No. PCT/CN2015/094070, English Translation of International Search Report dated Feb. 2, 2016, 7 pages.

(Continued)

*Primary Examiner* — Daniel McMahon
(74) *Attorney, Agent, or Firm* — Conley Rose, P.C.

(57) ABSTRACT

An apparatus comprises a 64b66b encoder configured to process operations, administration, and maintenance (OAM) information, determine a bit pattern based on the OAM information, form forward error correction (FEC) parity sync-headers based on the bit pattern, and form an FEC codeword with the FEC parity sync-headers, and a transmitter coupled to the 64b66b encoder and configured to transmit the FEC codeword. A method comprises processing OAM information, determining a bit pattern based on the OAM information, forming FEC parity sync-headers based on the bit pattern, forming an FEC codeword with the FEC parity sync-headers, and transmitting the FEC codeword. An apparatus comprises a receiver configured to receive an FEC codeword, and a 64b66b decoder coupled to the receiver and configured to extract FEC parity sync-headers from the FEC codeword, determine a bit pattern of the FEC parity sync-headers, and determine OAM information based on the bit pattern.

20 Claims, 5 Drawing Sheets

(56) References Cited

U.S. PATENT DOCUMENTS

| | | | |
|---|---|---|---|
| 8,208,809 B2 | 6/2012 | Leung et al. | |
| 8,245,095 B2 | 8/2012 | Ou et al. | |
| 8,270,832 B2 | 9/2012 | Luo et al. | |
| 8,281,228 B2 | 10/2012 | Geng et al. | |
| 8,880,975 B2 | 11/2014 | Geng et al. | |
| 2002/0080828 A1* | 6/2002 | Ofek | H04L 12/6418 370/539 |
| 2008/0040643 A1 | 2/2008 | Effenberger | |
| 2008/0115037 A1 | 5/2008 | Effenberger | |
| 2009/0263130 A1* | 10/2009 | Luo | H04Q 11/0067 398/58 |
| 2011/0142437 A1* | 6/2011 | Luo | H04J 3/0608 398/1 |
| 2011/0173516 A1 | 7/2011 | Geng et al. | |
| 2011/0236017 A1* | 9/2011 | Ohlen | H04J 14/0282 398/34 |
| 2014/0016926 A1* | 1/2014 | Soto | H04B 10/0775 398/16 |

OTHER PUBLICATIONS

Foreign Communication From A Counterpart Application, PCT Application No. PCT/CN2015/094070, English Translation of Written Opinion dated Feb. 2, 2016, 4 pages.
"IEEE Standard for Ethernet—Section Four," IEEE Standard 802.3-2012, 2012, 732 pages.
"IEEE Standard for Ethernet—Section Five," IEEE Standard 802.3-2012, 2012, 844 pages.
"40-Gigabit-Capable Passive Optical Networks (NG-PON2): Transmission Convergence Layer Specification," Draft New Recommendation ITU-T G.989.3, Sep. 17, 2015, 293 pages.

* cited by examiner

ADDING OPERATIONS, ADMINISTRATION, AND MAINTENANCE (OAM) INFORMATION IN 66-BIT CODE

CROSS-REFERENCE TO RELATED APPLICATIONS

This application claims priority to U.S. provisional patent application No. 62/077,467 filed Nov. 10, 2014 by Frank Effenberger, et al., and titled "Adding Operations, Administration, and Maintenance (OAM) Information in 66-Bit Code," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over the last mile, which is the final portion of a telecommunications network that delivers communication to customers. A PON is a point-to-multipoint (P2MP) network comprised of an optical line terminal (OLT) at a central office (CO), an optical distribution network (ODN), and optical network units (ONUs) at the user premises. PONs may also comprise remote nodes (RNs) located between the OLTs and the ONUs, for instance at the end of a road where multiple customers reside. In recent years, time-division multiplexing (TDM) PONs such as gigabit-capable PONs (GPONs) and Ethernet PONs (EPONs) have been deployed worldwide for multimedia applications.

SUMMARY

In one embodiment, the disclosure includes an apparatus comprising a 64b66b encoder configured to process operations, administration, and maintenance (OAM) information, determine a bit pattern based on the OAM information, form forward error correction (FEC) parity sync-headers based on the bit pattern; and form an FEC codeword with the FEC parity sync-headers; and a transmitter coupled to the 64b66b encoder and configured to transmit the FEC codeword. In some embodiments, the FEC parity sync-headers comprise a first sync-header, a second sync-header, a third sync-header, and a fourth sync-header. In some embodiments, the 64b66b encoder is further configured to the FEC parity sync-headers comprise a first sync-header, a second sync-header, a third sync-header, and a fourth sync-header, and/or when the OAM information is a binary 1 bit, form the first sync-header with binary 11 bits, form the second sync-header with binary 00 bits; form the third sync-header with binary 00 bits, and form the fourth sync-header with binary 11 bits, and/or when the OAM information is a binary 0 bit, the 64b66b encoder is further configured to form a first pattern with the FEC parity sync-headers, and/or when the OAM information is a binary 1 bit, the 64b66b encoder is further configured to form a second pattern with the FEC parity sync-headers, wherein the second pattern is a complement of the first pattern. In some embodiments, the OAM information comprises one bit so that an OAM rate is about 5 megabits per second (Mb/s). In some embodiments, the 64b66b encoder is further configured to form 27 data blocks, form 4 parity blocks comprising the FEC parity sync-headers, and further form the FEC codeword with the 27 data blocks and the 4 parity blocks so that the OAM information is carried in the FEC codeword of 31 blocks of data.

In another embodiment, the disclosure includes a method comprising processing OAM information, determining a bit pattern based on the OAM information, forming FEC parity sync-headers based on the bit pattern, forming an FEC codeword with the FEC parity sync-headers, and transmitting the FEC codeword. In some embodiments, the FEC parity sync-headers comprise a first sync-header, a second sync-header, a third sync-header, and a fourth sync-header. In some embodiments, when the OAM information is a binary 0 bit, the method further comprises forming the first sync-header with binary 00 bits, forming the second sync-header with binary 11 bits, forming the third sync-header with binary 11 bits, and forming the fourth sync-header with binary 00 bit, and/or when the OAM information is a binary 1 bit, the method further comprises forming the first sync-header with binary 11 bits, forming the second sync-header with binary 00 bits, forming the third sync-header with binary 00 bits, and forming the fourth sync-header with binary 11 bits. In some embodiments, when the OAM information is a binary 0 bit, the method further comprises forming a first pattern with the FEC parity sync-headers, and/or when the OAM information is a binary 1 bit, the method further comprises forming a second pattern with the FEC parity sync-headers, wherein the second pattern is a complement of the first pattern. In some embodiments, the OAM information comprises one bit so that an OAM rate is about 5 Mb/s. In some embodiments, the method further comprises forming 27 data blocks, forming 4 parity blocks comprising the FEC parity sync-headers, and further forming the FEC codeword with the 27 data blocks and the 4 parity blocks so that the OAM information is carried in the FEC codeword of 31 blocks of data.

In yet another embodiment, the disclosure includes an apparatus comprising a receiver configured to receive an FEC codeword, and a 64b66b decoder coupled to the receiver and configured to: extract FEC parity sync-headers from the FEC codeword, determine a bit pattern of the FEC parity sync-headers; and determine OAM information based on the bit pattern. In some embodiments, the FEC parity sync-headers comprise a first sync-header, a second sync-header, a third sync-header, and a fourth sync-header. In some embodiments, the 64b66b decoder is further configured to determine that the OAM information is a binary 0 bit when the OAM information is a binary 0 bit when the first sync-header comprises binary 00 bits, the second sync-header comprises binary 11 bits, the third sync-header comprises binary 11 bits, and the fourth sync-header comprises binary 00 bits; and/or determine that the OAM information is a binary 1 bit when the first sync-header comprises binary 11 bits, the second sync-header comprises binary 00 bits, the third sync-header comprises binary 00 bits, and the fourth sync-header comprises binary 11 bits.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
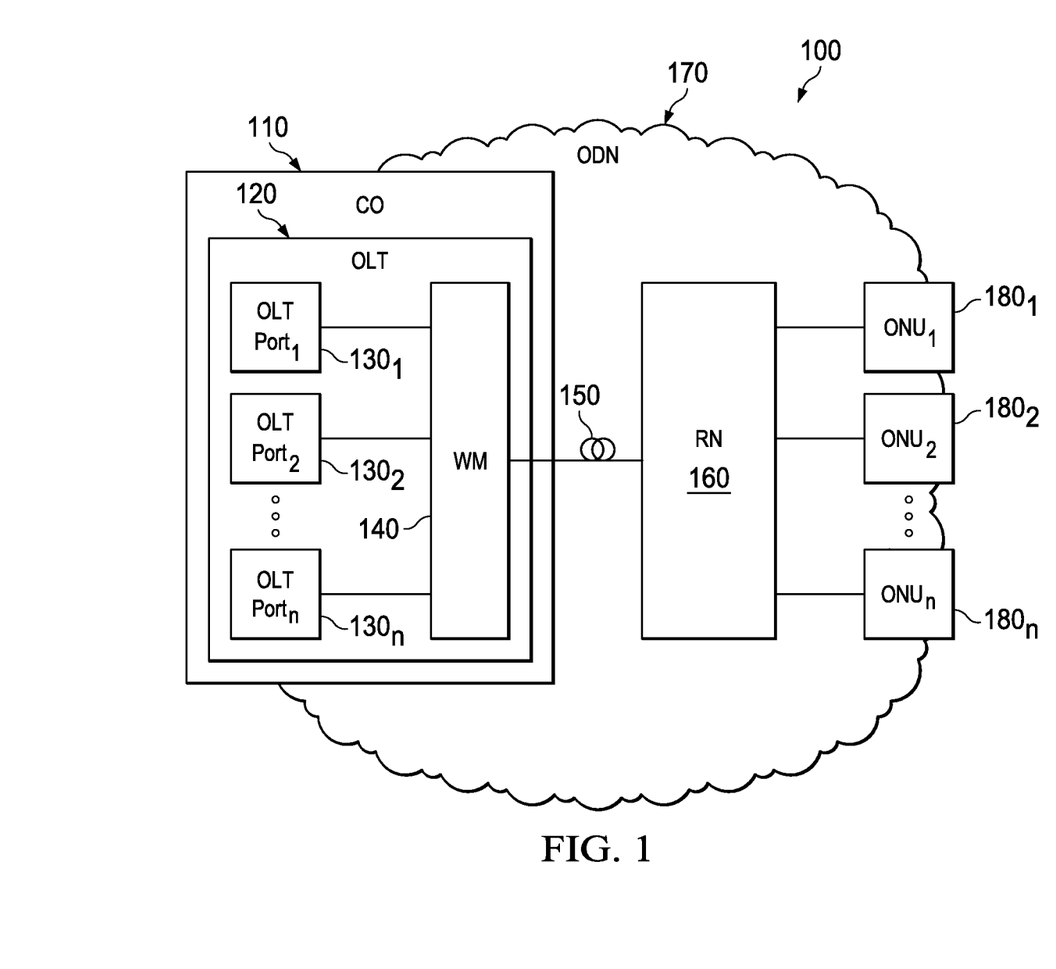
FIG. 1 is a schematic diagram of an embodiment of a PON.

FIG. 1 is a schematic diagram of a PON 100. The PON 100 may be suitable for implementing the disclosed embodiments. The PON 100 may comprise an OLT 120 located in a CO 110, $ONUs_{1-n}$ $180_{1-n}$ located at the customers' premises, and an ODN 170 that couples the OLT 120 to the $ONUs_{1-n}$ $180_{1-n}$. N may be any positive integer. The PON 100 may provide wavelength-division multiplexing (WDM) capability by associating a downstream wavelength and an upstream wavelength with each OLT $port_{1-n}$ $130_{1-n}$ so that a plurality of wavelengths is present, then combining those wavelengths into a single optical fiber cable 150 via a wavelength multiplexer/demultiplexer (WM) 140 and distributing the wavelengths to the $ONUs_{1-n}$ $180_{1-n}$ through an RN 160. The PON 100 may provide TDM as well.

The PON 100 may be a communications network that does not require any active components to distribute data between the OLT 120 and the $ONUs_{1-n}$ $180_{1-n}$. Instead, the PON 100 may use passive optical components in the ODN 170 to distribute data between the OLT 120 and the $ONUs_{1-n}$ $180_{1-n}$. The PON 100 may adhere to any standard related to multiple-wavelength PONs.

The CO 110 may be a physical building and may comprise servers and other backbone equipment designed to service a geographical area with data transfer capability. The CO 110 may comprise the OLT 120, as well as additional OLTs. If multiple OLTs are present, then any suitable access scheme may be used among them.

The OLT 120 may comprise the OLT $ports_{1-n}$ $130_{1-n}$ and the WM 140. The OLT 120 may be any device suitable for communicating with the $ONUs_{1-n}$ $180_{1-n}$ and another network. Specifically, the OLT 120 may act as an intermediary between the other network and the $ONUs_{1-n}$ $180_{1-n}$. For instance, the OLT 120 may forward data received from the network to the $ONUs_{1-n}$ $180_{1-n}$ and may forward data received from the $ONUs_{1-n}$ $180_{1-n}$ to the other network. When the other network uses a network protocol that differs from the PON protocol used in the PON 100, the OLT 120 may comprise a converter that converts the network protocol to the PON protocol. The OLT 120 converter may also convert the PON protocol into the network protocol. Though the OLT 120 is shown as being located at the CO 110, the OLT 130 may be located at other locations as well.

The OLT $ports_{1-n}$ $130_{1-n}$ may be any ports suitable for transmitting waves to and receiving waves from the WM 140. For instance, the OLT $ports_{1-n}$ $130_{1-n}$ may comprise laser transmitters to transmit waves and photodiodes to receive waves, or the OLT $ports_{1-n}$ $130_{1-n}$ may be connected to such transmitters and photodiodes. The OLT $ports_{1-n}$ $130_{1-n}$ may transmit and receive waves in any suitable wavelength bands.

The WM 140 may be any suitable wavelength multiplexer/demultiplexer such as an arrayed waveguide grating (AWG). The WM 140 may multiplex the waves received from the OLT $ports_{1-n}$ $130_{1-n}$ then forward the combined waves to the RN 160 via the optical fiber cable 150. The WM 140 may also demultiplex the waves received from the RN 160 via the optical fiber cable 150.

The RN 160 may be any component positioned within the ODN 170 that provides partial reflectivity, polarization rotation, and WDM capability. For example, the RN 160 may comprise a WM similar to the WM 140. The RN 160 may exist closer to the $ONUs_{1-n}$ $180_{1-n}$ than to the CO 110, for instance at the end of a road where multiple customers reside, but the RN 160 may also exist at any suitable point in the ODN 170 between the $ONUs_{1-n}$ $180_{1-n}$ and the CO 110.

The ODN 170 may be any suitable data distribution network, which may comprise optical fiber cables such as the optical fiber cable 150, couplers, splitters, distributors, or other equipment. The optical fiber cables, couplers, splitters, distributors, or other equipment may be passive optical components and therefore not require any power to distribute data signals between the OLT 120 and the $ONUs_{1-n}$ $180_{1-n}$. Alternatively, the ODN 170 may comprise one or more active components such as optical amplifiers or a splitter. The ODN 170 may typically extend from the OLT 120 to the $ONUs_{1-n}$ $180_{1-n}$ in a branching configuration as shown, but the ODN 170 may be configured in any suitable P2MP configuration.

The $ONUs_{1-n}$ $180_{1-n}$ may comprise laser transmitters to transmit waves and photodiodes to receive waves. The $ONUs_{1-n}$ $180_{1-n}$ may be any devices suitable for communicating with the OLT 120 and customers. Specifically, the $ONUs_{1-n}$ $180_{1-n}$ may act as intermediaries between the OLT 120 and the customers. For instance, the $ONUs_{1-n}$ $180_{1-n}$ may forward data received from the OLT 120 to the customers and forward data received from the customers to the OLT 120. The $ONUs_{1-n}$ $180_{1-n}$ may be similar to optical network terminals (ONTs), so the terms may be used interchangeably. The $ONUs_{1-n}$ $180_{1-n}$ may typically be located at distributed locations such as the customer premises, but may be located at other suitable locations as well.

An EPON is an emerging access network that provides low-cost methods of deploying optical access lines between a CO and customers' premises. EPONs seek to bring forth a full-service access network that delivers data, video, and voice over a single optical access system. Optional FEC methods are used to improve communication reliability in error-prone environments like EPONs. In an FEC process, an EPON frame may be encapsulated into an FEC frame carrying parity and other FEC bits. Use of FEC results in an increased link budget, which enables higher bit rates, longer optical terminal to optical network unit distances, and higher split ratios for a single PON.

Institute of Electrical and Electronics Engineers (IEEE) 802.3-2012, Section Four, which is incorporated by reference, discusses 64B/66B in clause 49. 64B/66B is a line code that transforms 64-bit data to 66-bit line code to provide enough state changes to allow reasonable clock recovery and facilitate alignment of a data stream at a receiver. 64B/66B provides for the transmission of Ethernet frames using 66-bit blocks. Each block contains a 64-bit payload and a 2-bit sync header. For some applications, the transmission of 10 gigabit/second (Gb/s) Ethernet-formatted data requires additional features that are not provided in the basic format. Two such features are the inclusion of FEC and low-level OAM information.

There are two standardized methods to add FEC to 64B/66B data. The first method adds a small amount of error tolerance and is described in clause 74 of IEEE 802.3-2012, Section Five, which is incorporated by reference. The second method adds a large amount of error tolerance and is described in clause 76 of IEEE 802.3-2012, Section Five, as well as U.S. Pat. Nos. 8,171,370; 8,281,228; 8,270,832; 8,245,095; 8,208,809; 8,880,975; and 8,122,325, which are incorporated by reference. The second method is the most relevant FEC method for optical transmission systems.

Figure 2:
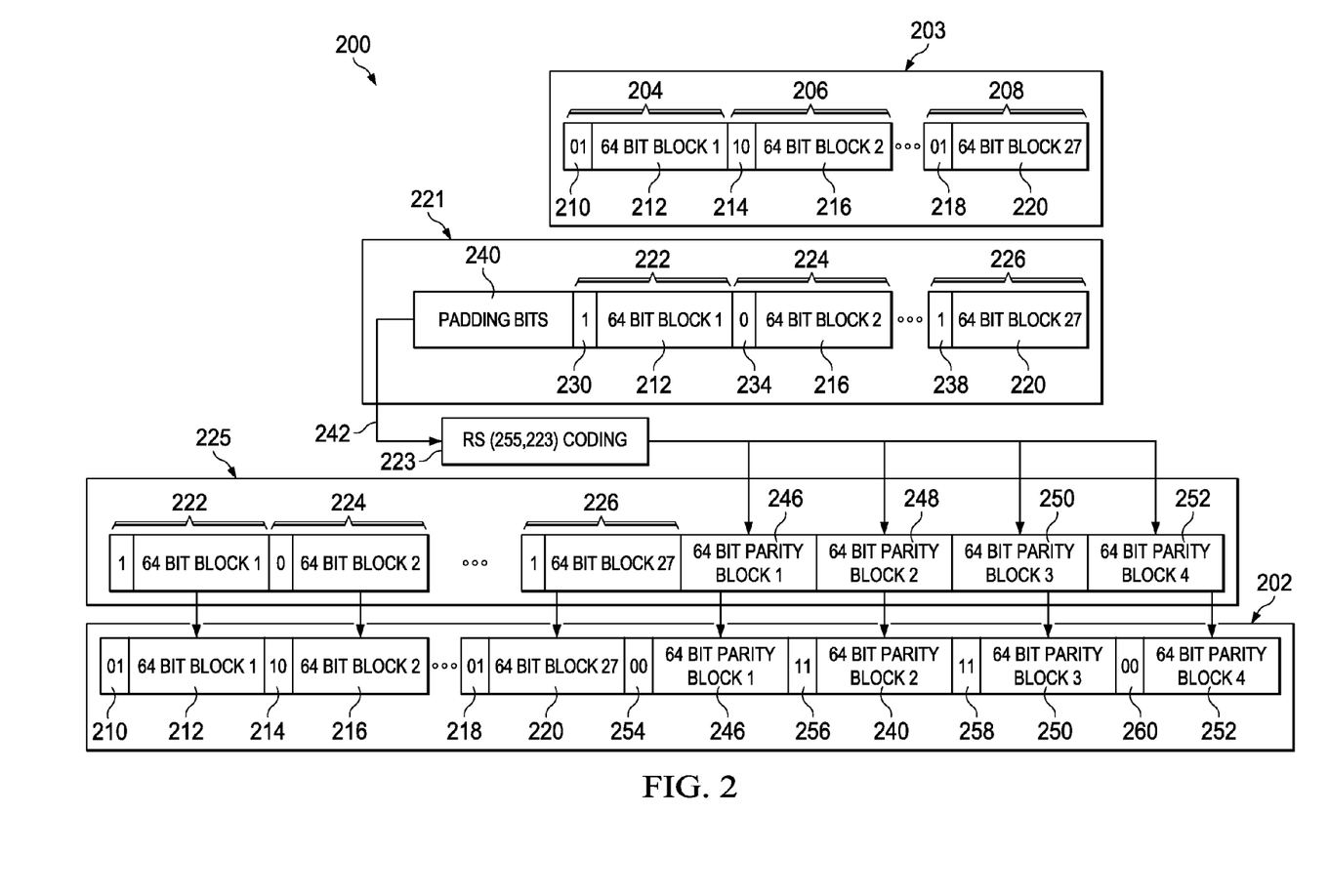
FIG. 2 is an illustration of an embodiment of a mechanism for adding FEC.

FIG. 2 is an illustration of a mechanism 200 for providing FEC with 64b/66b data which may be used in conjunction with the inclusion of OAM information as described further below. The mechanism 200 shows how the second method described above adds FEC through the generation of parity blocks and the insertion of the parity blocks into a codeword 202 including both the payload data and the parity blocks. Specifically, for every 27 payload blocks 203, 4 parity blocks are added, as described further below. Each of the 27 payload blocks comprises a 64-bit payload and a two-bit payload block sync header loaded into each payload block. Thus, the first payload block 204 of the 27 payload blocks 203 comprises a 64-bit payload 212 and a two-bit payload block sync header 210, having the value "01" by way of example. Similarly, the second payload block 206 includes a 64-bit payload 216 and a two-bit payload block sync header 214 containing the value "10" by way of example, and the twenty-seventh payload block 208 comprises a 64-bit payload 220 and a payload block sync header 218 containing the value "01". The values of the payload block sync headers are examples, and may change depending on the type of the payload in the corresponding payload block.

The FEC is based on a Reed-Solomon code comprising 32 parity bytes, and 223 data bytes. This Reed-Solomon code is referred to as an RS(255, 223) code. Thus, to provide the 223 data bytes to a Reed-Solomon encoder, the 27 payload blocks 203 are mapped onto a codeword payload 221 comprising 27 65-bit blocks. Each of the 65-bit blocks may comprise a 1-bit header derived from a corresponding payload block sync header and the 64-bit payload. For example, the first 65-bit block 222 comprises a 64-bit payload 212 and a header 230 containing the value "1" corresponding to the least significant bit (LSB) of the payload block sync header 210, the second 65-bit block 224 may comprise a 64-bit payload 216 and a header 234 containing the value "0" corresponding to the LSB of payload block sync header 214, and the 27$^{th}$ 65-bit block 226 comprises a 64-bit payload 220 and a 1-bit header 238 containing the value "1" corresponding to the payload block sync header 218. The values contained in the 1-bit headers are examples and may change with changes in values of the payload block sync headers, such as payload block sync headers 210, 214, 218. The twenty-seven 65-bit blocks encompass a total of 1755 bits, leaving 29 padding bits 240 to pad out a total of 223 bytes.

The padding bits 240 in codeword payload 221 may be padded stuffed with zeros for example. Alternatively, the padding bits 240 may be used to encode OAM data as described further below in conjunction with FIG. 3.

The twenty-seven 65-bit blocks 203 and the 29 padding bits 240 are input to a RS(255, 223) encoder 223 as indicated by the path 242. The RS(255, 223) encoder 223 outputs four 64-bit parity blocks 246, 248, 250, and 252. Thus, the four parity blocks 246, 248, 250, 252 are calculated based on the twenty-seven 65-bit blocks 203 and the 29 padding bits 240. The group of 31 blocks 225 then is mapped to a FEC codeword 202 which includes the group of 31 blocks 225 and four parity sync headers 254, 256, 258, and 260. To decode the codeword, a receiver needs to find the start and end of the codeword. This is accomplished by marking the parity blocks 246, 248, 250, and 252 with a special pattern for the parity sync headers 254, 256, 258, 260. Those parity sync headers 254, 256, 258, 260 comprise two bits, and are different from the payload block sync headers 210, 214, 218 because the parity sync headers 254, 256, 258, 260 have a specific pattern, namely 00, 11, 11, 00. This distinction makes it simple for the receiver to determine the codeword alignment and decode the data.

The padding bits 240 are not transmitted over the link. Thus, if one or more of these bits were used to transmit OAM data, the receiver would have an incomplete codeword, which would contain the 27 payload blocks 203 and the 4 parity blocks 246, 248, 250, 252, but not the OAM data. This OAM data can be considered an "erasure" of the channel—that is, data that is known to be lost. The receiver can use the FEC algorithm to deduce the OAM data that is missing. However, doing so takes away from some of the error correcting capacity of the system. Thus, there remains a need for carrying OAM information in 66-bit systems that does not diminish the error correcting capacity of the system.

Disclosed herein are embodiments for carrying OAM information in 66-bit systems. Specifically, a single OAM bit is sent in every FEC codeword. The OAM bit may be used to determine the FEC block sync-header patterns. The disclosed embodiments are described in the context of the FEC mechanism described in clause 76, but the disclosed embodiments apply to any coded systems with sync-header patterns.

When sending OAM information, it may be desirable to keep the code format as close as practicable to the standardized format. Thus, in at least some embodiments, the amount of OAM information transmitted in a single codeword may be minimized. The smallest amount of OAM information would be 1 bit per FEC codeword. The sync headers may be adapted for sending the OAM information, thus preserving the actively used payload bits and parity bits. In particular, as described above, in the FEC codeword, the sync headers have a fixed bit pattern. To incorporate OAM information, the encoding rule for the parity sync headers may be changed to include two predetermined bit patterns. The 1 bit of OAM information can be used to determine which of the two bit patterns should be transmitted. One of the bit patterns is the existing pattern, 00, 11, 11, 00, and the other bit pattern is the complement, 11, 00, 00, 11. The bit patterns may thus each have 8 bits.

Using two bit patterns roughly doubles the chances of seeing a false sync-header pattern. However, the functioning of the receiver synchronization state machine already results in a very low probability of false alignment. The mean time to false lock is measured in millions of years. This small impact is therefore tolerable.

Figure 3:
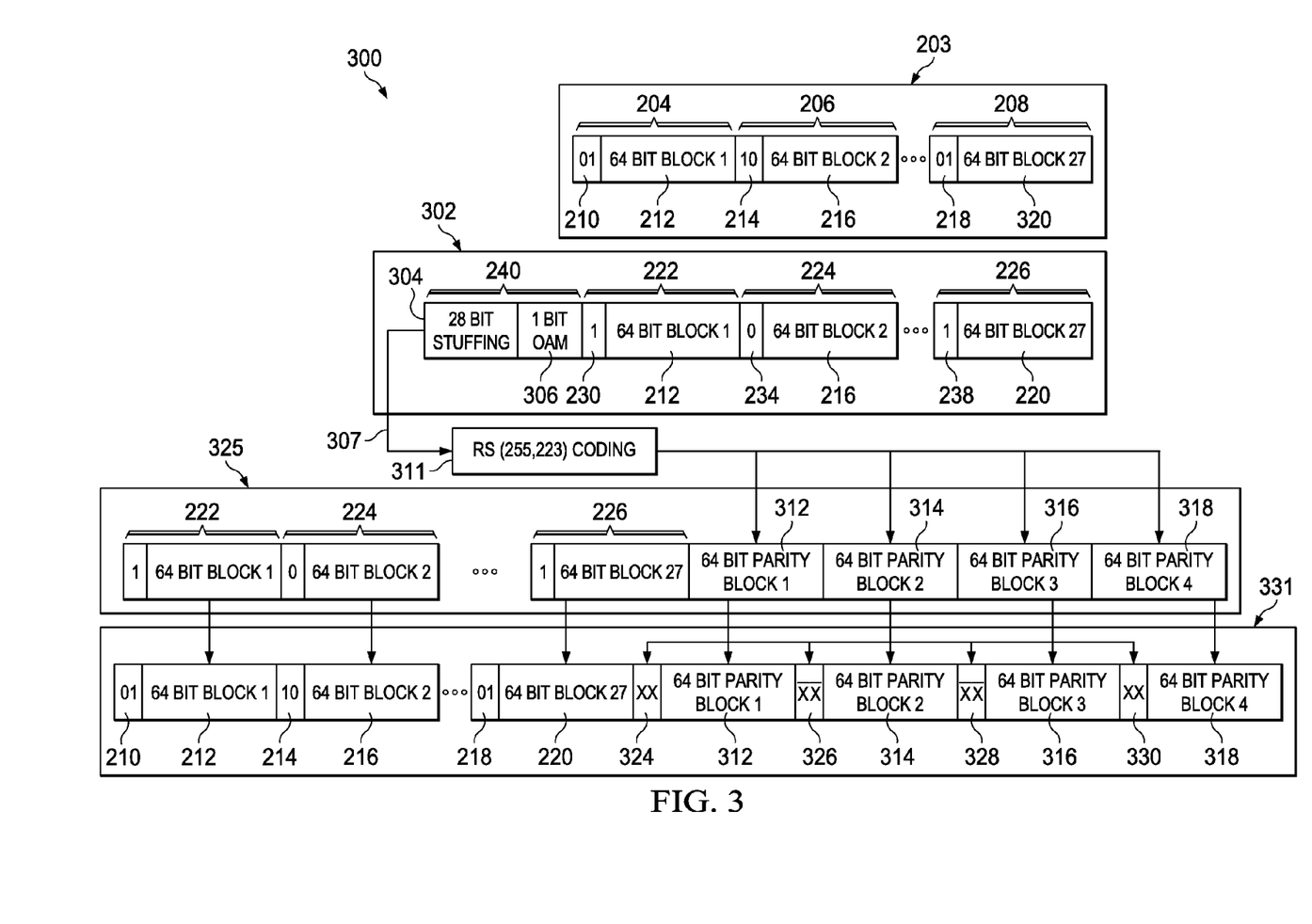
FIG. 3 is an illustration of an embodiment of a mechanism for adding FEC with OAM information according to an embodiment of the disclosure.

FIG. 3 is an illustration of a mechanism 300 for adapting an FEC codeword like the codeword 202 to include OAM information according to an embodiment of the disclosure. The mechanism may be implemented, for example, by a network device as shown in FIG. 5 described below. As in FIG. 2, each of the 27 payload blocks 203 comprises a 64-bit payload block 204, 216, 208 and a two-bit payload block sync header 210, 214, 218 loaded into each block. As described above, the FEC is based on a Reed-Solomon code comprising 32 parity bytes and 223 data bytes. This Reed-Solomon code is referred to as an RS(255, 223) code. To provide the 223 data bytes to a Reed-Solomon encoder 311, the 27 payload blocks 203 are mapped onto a codeword payload 302 comprising 27 65-bit blocks. Similarly to FIG. 2, each of the 65-bit blocks comprises a 1-bit header derived from a corresponding payload block sync header and the 64-bit payload. For example, the first 65-bit block 222 comprises a 64-bit payload 212 and a header 230 containing the value "1" corresponding to the LSB of the payload block sync header 210, the second 65-bit block 224 comprises a 64-bit payload 216 and a header 234 containing the value "0" corresponding to the LSB of the payload block sync header 214, and the twenty-seventh 65-bit block 226 comprises a 64-bit payload 220 and a 1-bit header 238 containing the value "1" corresponding to the LSB of the payload block sync header 218. The values contained in the 1-bit headers are examples and may change with changes in values of the payload block sync headers. Again the twenty-seven 65-bit blocks encompass a total of 1755 bits, leaving the 29 padding bits 240 to pad out a total of 223 bytes. In the mechanism 300, the 29 padding bits 240 comprise a 28-bit padding 304 and a 1-bit OAM datum 306. The OAM datum 306 may contain either a "0" or "1".

The twenty-seven 65-bit blocks 325 and the 28-bit padding 304, and the OAM datum 306 are input to an RS(255, 223) encoder 311 as indicated by the path 307. The RS(255, 223) encoder 311 generates, four 64-bit parity blocks 312, 314, 316 and 318. Thus, the four parity blocks 312, 314, 316, 318 are calculated based on the twenty-seven 65-bit blocks 222, 224, 226, the 28 padding bits 304, and the 1-bit OAM datum 306. Consequently, the values of the parity bits reflect not only the twenty-seven payload blocks 203, but also the OAM datum 306. The group of 31 blocks and four parity sync headers that delimit the parity blocks 312, 314, 316 and 318 constitute an FEC codeword 331.

In the FEC codeword 331, the four parity blocks 312, 314, 316 and 318 each comprise two bits and together form a pattern. Rather than a fixed pattern comprising alternating pairs of complementary values, the pattern comprises one of two alternating complementary values based on the value of the 1-bit OAM datum 306. Thus, the symbol "XX" in parity sync headers 324, 330 of a sync header-pattern denotes a pair of bits having either the value "00" or "11." The symbol the "$\overline{XX}$" in sync headers 326, 328 denotes the complement of the pair of bits in the parity sync headers 324, 330. As would be appreciated by those of ordinary skill in the art, the complement of a bit "0" is "1" and vice versa. By detecting the sync-header pattern, the receiver can determine which OAM bit was contained in the 1-bit OAM datum 306. For example, a "0" in the 1-bit OAM datum 306 corresponds to the pattern 00 11 11 00 contained in the parity sync headers 324, 326, 328 and 330, respectively. Conversely, a "1" in the OAM datum 306 corresponds to the complementary pattern 11 00 00 11 contained in parity sync headers 324, 326, 328 and 330, respectively. Alternatively, a "0" in the OAM datum 306 corresponds to the pattern 11 00 00 11 contained in the parity sync headers 324, 326, 328 and 330, respec-tively, and a "1" in the OAM datum 306 corresponds to the pattern 00 11 11 00 contained in the parity sync headers 324, 326, 328 and 330, respectively.

On receiving the codeword 331, the receiver calculates its own parity blocks to verify the error-free receipt of the payload and corrects the payload data if there are errors. As previously described, the 29 bits comprising the 28 padding bits 304 and the 1-bit OAM datum 306 are not transmitted down the link. However, by detecting the sync-header pattern, the receiver can infer the value of the OAM data as either "0" or "1" and regenerate the value and use it along with the received payload to calculate its four 64-bit parity blocks. If the parity blocks compare, the receiver knows there is no error in the payload data. If the parity blocks do not compare, then the receiver may use the difference between the received and calculated parity blocks to correct the received payload data.

Thus, OAM information is reflected in the mechanism 300 in three ways. First, there is an addition of a 1-bit OAM datum 306. Second, the 1-bit OAM datum 306 replaces one of the padding bits 240 in FIG. 2. The symbol "X" denotes a bit which may take a binary value "0" or "1." The values "0" and "1" represent complementary logical values taken by a parameter in an embodiment of the codeword 331 and do not necessarily correspond to values of the physical embodiment of the parameter. Third, the 1-bit OAM datum 306 determines the parity sync-header pattern. The symbol "XX" in sync header-pattern denotes a pair of bits having either the value "00" or "11". The symbol "$\overline{XX}$" denotes a pair of bits having the complementary value.

The FEC algorithm used in 64b66b code format is RS (255, 223), and this algorithm actually has a small number of unused payload bits. These unused bits are filled with zero before the parity is calculated. In order to keep as close to the standardized 64b66b code with FEC format as possible, the amount of Point-to-Point (PtP) WDM OAM information to be sent with 64b66b coded services must be reduced. FIG. 3 shows a way of sending 1-bit OAM information per FEC codeword.

The best place to send this information is in the sync-headers, as the payload and parity bits are actively used. The 1 bit of OAM information determines which of the two bit patterns should be transmitted in the parity sync-headers. For example, as shown in FIG. 3, when the PtP WDM OAM bit is 0, the FEC parity sync-header pattern is the existing pattern (00, 11, 11, 00). When the PtP WDM OAM bit is 1, the FEC parity sync-header pattern is the complement, in other word, (11, 00, 00, 11).

In this way, one bit of OAM information is carried in each codeword of 31 blocks of data. Because this format is used for 10 Gb/s data links, the data rate is approximately 5 megabits per second (Mb/s), which is fast enough for the OAM application. The OAM information can also be carried via the FEC payload block sync-header patterns.

Figure 4:
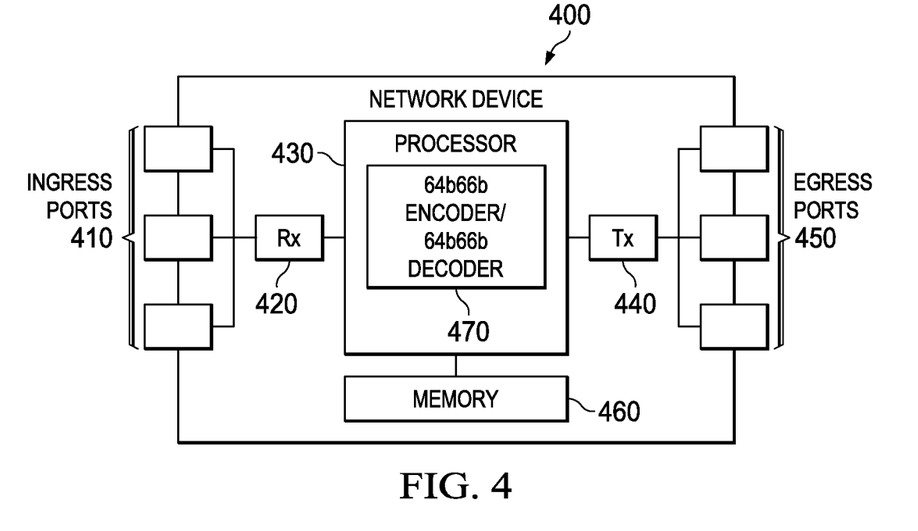
FIG. 4 is a schematic diagram of a network device according to an embodiment of the disclosure.

FIG. 4 is schematic diagram of a network device 400 according to an embodiment of the disclosure. The network device 400 is suitable for implementing the disclosed embodiments. The network device 400 comprises ingress ports 410 and receiver units (Rx) 420 for receiving data; a processor, logic unit, or central processing unit (CPU) 430 to process the data; transmitter units (Tx) 440 and egress ports 450 for transmitting the data; and a memory 460 for storing the data. The network device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), field-programmable gate arrays (FPGAs), application specific integrated circuits (ASICs), and digital signal processors (DSPs). The processor 430 is coupled to and in communication with the ingress ports 410, receiver units 420, transmitter units 440, egress ports 450, and memory 460. The processor 430 comprises a 64b66b encoder/decoder 470. The 64b66b encoder/decoder 470 assists in implementing the disclosed embodiments. The inclusion of the 64b66b encoder/decoder 470 therefore provides a substantial improvement to the functionality of the network device 400 and effects a transformation of the network device 400 to a different state. Alternatively, the 64b66b encoder/decoder 470 is implemented as instructions stored in the memory 460 and executed by the processor 430.

The memory 460 comprises one or more disks, tape drives, and solid-state drives and may be used as an overflow data storage device, to store programs when such programs are selected for execution, and to store instructions and data that are read during program execution. The memory 460 may be volatile and non-volatile and may be read-only memory (ROM), random-access memory (RAM), ternary content-addressable memory (TCAM), and static random-access memory (SRAM).

Figure 5:
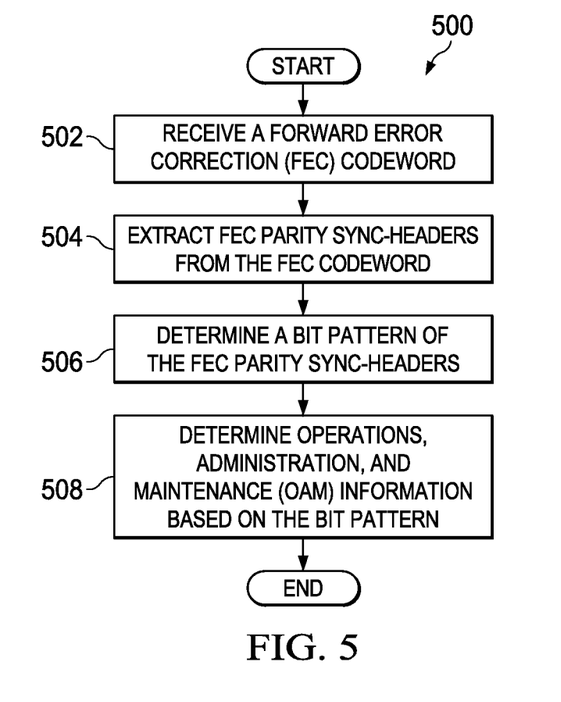
FIG. 5 is a flowchart of a method for receiving an FEC codeword according to an embodiment of the disclosure.

FIG. 5 is a flowchart of a method 500 for receiving an FEC codeword according to an embodiment of the disclosure. At step 502, an FEC codeword is received. For instance, the receiver 420 of the network device 400 receives the FEC codeword 331. At step 504, FEC parity sync-headers are extracted from the FEC codeword. For instance, the 64b66b encoder/decoder 470 extracts the parity sync headers 324, 326, 328, 330 from the FEC codeword 331. At step 506, a bit pattern is determined from the FEC parity sync-headers. For instance, the 64b66b encoder/decoder 470 determines whether the parity sync headers 324, 326, 328, 330 have a (00, 11, 11, 00) pattern or a (11, 00, 00, 11) pattern. Finally, at step 508, OAM information is determined based on the bit pattern. For instance, the 64b66b encoder/decoder 470 determines that the OAM information is a binary 0 if the bit pattern is (00, 11, 11, 00) or a binary 1 if the bit pattern is (11, 00, 00, 11).

Figure 6:
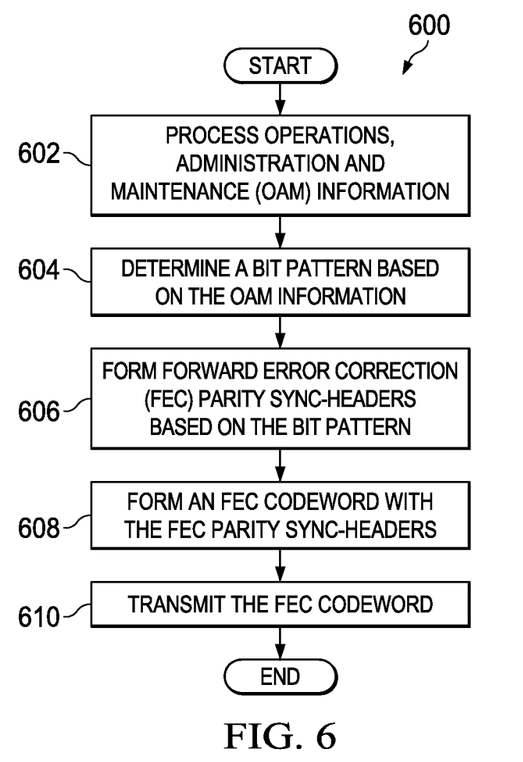
FIG. 6 is a flowchart of a method for transmitting an FEC codeword according to an embodiment of the disclosure.

FIG. 6 is a flowchart of a method 600 for transmitting an FEC codeword according to an embodiment of the disclosure. At step 602, OAM information is processed. For instance, the 64b66b encoder/decoder 470 in the network device 400 processes the 1-bit OAM datum 306. At step 604, a bit pattern is determined based on the OAM information. For instance, the 64b66b encoder/decoder 470 determines that a bit pattern is (00, 11, 11, 00) if the 1-bit OAM datum 306 is a binary 0 or (11, 00, 00, 11) if the 1-bit OAM datum 306 is a binary 1. At step 606, FEC parity sync-headers are formed based on the bit pattern. For instance, the 64b66b encoder/decoder 470 forms the parity sync headers 324, 326, 328, 330 based on the bit pattern. At step 608, an FEC codeword is formed with the FEC parity sync-headers. For instance, the 64b66b encoder/decoder 470 forms the FEC codeword 331 with the parity sync headers 324, 326, 328, 330. Finally, at step 610, the FEC codeword is transmitted. For instance, the transmitter 440 of the network device 400 transmits the FEC codeword 331.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
 a 64b66b encoder configured to:
  process operations, administration, and maintenance (OAM) information;
  determine a bit pattern based on the OAM information;
  form forward error correction (FEC) parity sync-headers based on the bit pattern; and
  form an FEC codeword with the FEC parity sync-headers; and
 a transmitter coupled to the 64b66b encoder and configured to transmit the FEC codeword.

2. The apparatus of claim 1, wherein the FEC parity sync-headers comprise a first sync-header, a second sync-header, a third sync-header, and a fourth sync-header.

3. The apparatus of claim 2, wherein, when the OAM information is a binary 0 bit, the 64b66b encoder is further configured to:
 form the first sync-header with binary 00 bits;
 form the second sync-header with binary 11 bits;
 form the third sync-header with binary 11 bits; and
 form the fourth sync-header with binary 00 bits.

4. The apparatus of claim 2, wherein, when the OAM information is a binary 1 bit, the 64b66b encoder is further configured to:
 form the first sync-header with binary 11 bits;
 form the second sync-header with binary 00 bits;
 form the third sync-header with binary 00 bits; and
 form the fourth sync-header with binary 11 bits.

5. The apparatus of claim 1, wherein, when the OAM information is a binary 0 bit, the 64b66b encoder is further configured to form a first pattern with the FEC parity sync-headers.

6. The apparatus of claim 5, wherein, when the OAM information is a binary 1 bit, the 64b66b encoder is further configured to form a second pattern with the FEC parity sync-headers, wherein the second pattern is a complement of the first pattern.

7. The apparatus of claim 1, wherein the OAM information comprises one bit so that an OAM rate is 5 megabits per second (Mb/s).

8. The apparatus of claim 1, wherein the 64b66b encoder is further configured to:
 form 27 data blocks;
 form 4 parity blocks comprising the FEC parity sync-headers; and
 further form the FEC codeword with the 27 data blocks and the 4 parity blocks so that the OAM information is carried in the FEC codeword of 31 blocks of data.

9. A computer-implemented method comprising:
processing operations, administration, and maintenance (OAM) information;
determining a bit pattern based on the OAM information;
forming forward error correction (FEC) parity sync-headers based on the bit pattern;
forming an FEC codeword with the FEC parity sync-headers; and
transmitting the FEC codeword.

10. The method of claim 9, wherein the FEC parity sync-headers comprise a first sync-header, a second sync-header, a third sync-header, and a fourth sync-header.

11. The method of claim 10, wherein, when the OAM information is a binary 0 bit, the method further comprises:
forming the first sync-header with binary 00 bits;
forming the second sync-header with binary 11 bits;
forming the third sync-header with binary 11 bits; and
forming the fourth sync-header with binary 00 bits.

12. The method of claim 10, wherein, when the OAM information is a binary 1 bit, the method further comprises:
forming the first sync-header with binary 11 bits;
forming the second sync-header with binary 00 bits;
forming the third sync-header with binary 00 bits; and
forming the fourth sync-header with binary 11 bits.

13. The method of claim 9, wherein, when the OAM information is a binary 0 bit, the method further comprises forming a first pattern with the FEC parity sync-headers.

14. The method of claim 13, wherein, when the OAM information is a binary 1 bit, the method further comprises forming a second pattern with the FEC parity sync-headers, wherein the second pattern is a complement of the first pattern.

15. The method of claim 9, wherein the OAM information comprises one bit so that an OAM rate is 5 megabits per second (Mb/s).

16. The method of claim 9, further comprising:
forming 27 data blocks;
forming 4 parity blocks comprising the FEC parity sync-headers; and
further forming the FEC codeword with the 27 data blocks and the 4 parity blocks so that the OAM information is carried in the FEC codeword of 31 blocks of data.

17. An apparatus comprising:
a receiver configured to receive a forward error correction (FEC) codeword; and
a 64b66b decoder coupled to the receiver and configured to:
extract FEC parity sync-headers from the FEC codeword;
determine a bit pattern of the FEC parity sync-headers; and
determine operations, administration, and maintenance (OAM) information based on the bit pattern.

18. The apparatus of claim 17, wherein the FEC parity sync-headers comprise a first sync-header, a second sync-header, a third sync-header, and a fourth sync-header.

19. The apparatus of claim 18, wherein the 64b66b decoder is further configured to determine that the OAM information is a binary 0 bit when:
the first sync-header comprises binary 00 bits;
the second sync-header comprises binary 11 bits;
the third sync-header comprises binary 11 bits; and
the fourth sync-header comprises binary 00 bits.

20. The apparatus of claim 18, wherein the 64b66b decoder is further configured to determine that the OAM information is a binary 1 bit when:
the first sync-header comprises binary 11 bits;
the second sync-header comprises binary 00 bits;
the third sync-header comprises binary 00 bits; and
the fourth sync-header comprises binary 11 bits.

* * * * *